2,982,617

PREPARATION OF PERCHLORYL FLUORIDE

William A. La Lande, Jr., Wyndmoor, Pa., assignor to Pennsalt Chemicals Corporation, Philadelphia, Pa., a corporation of Pennsylvania No Drawing. Filed Apr. 1, 1960, Ser. No. 19,145

12 Claims. (Cl. 23—203)

This invention relates to an improved method for the preparation of a derivative of perchloric acid. More particularly it relates to the preparation of perchloryl fluoride, $ClO_3F$.

This application is a continuation-in-part of Serial No. 554,622, filed December 22, 1955, now abandoned.

Perchloryl fluoride, $ClO_3F$, is characterized by its heptavalent chlorine, $Cl^{+7}$. Its structural formula is

The compound is a colorless gas at ordinary temperatures. When liquefied, it boils at —47.5° C. at 760 mm. pressure. It solidifies to a white crystalline solid at —146° C. The gas is thermally stable even when heated in a glass container to the softening point of the glass.

Chemically, perchloryl fluoride is a strong oxidant which vigorously supports combustion, but which, surprisingly, does not spontaneously ignite most organic materials as do other strong oxidants. For example, unlike fluorine and liquid oxygen, perchloryl fluoride may be brought into contact with most organic materials at ordinary temperatures and atmospheric pressure without igniting them. The gas is readily liquefied and can be stored as a liquid for long periods of time.

Perchloryl fluordie has potential value as an oxidizing agent in dye chemistry (for example, it oxidizes diphenylamine to form a dye), as a chemical cutter for steel, as a component of an explosive for mining and construction work, and as a liquid propellant, being in this respect similar to liquid oxygen, hydrogen peroxide and nitric acid. Importantly, it possesses the added advantages of having relatively low pressures at ordinary temperatures (about 150 p.s.i. at 75° F.) and of being capable of prolonged storage as a liquid in ordinary steel cylinders without loss or deterioration. Its physical and chemical properties thus make perchloryl fluoride a remarkably useful and valuable oxidant.

The preparation of perchloryl fluoride involves the combination of fluorine and oxygen with chlorine in its highest state of oxidation. Perchloryl fluoride has been prepared by starting with a salt of an oxychloride in which the chlorine is at a lower level of oxidation and simultaneously oxidizing and metathesizing the salt with an oxidizing fluorinating agent, e.g., reacting potassium chlorate with elemental fluorine (H. Bode and E. Klesper, Z. anorg. Allg. Chem. 266, 275–280, 1951).

Another method (A. Engelbrecht and H. Atzwanger, Mh. Chem. 83, 1087, 1952) is based on metathesis of a metal salt of an oxychloride in which chlorine is in its highest valence state with an acid fluoride under conditions of electrolysis, e.g., electrolysis of sodium perchlorate in anhydrous hydrofluoric acid.

The yield of perchloryl fluoride in each of the above methods is relatively low by commercial standards.

It has now surprisingly been found that fluosulfonic acid, or materials furnishing fluosulfonic acid, can be used with a perchlorate to prepare perchloryl fluoride in excellent yields. It is expected that yields in excess of 80% can be achieved.

This discovery is remarkable because it was found that certain of the highly reactive comon fluorinating agents do not readily form perchloryl fluoride, or form none at all, when they are reacted with a perchlorate. For example, fluorine, anhydrous hydrofluoric acid in the absence of electrolyzing conditions, antimony trifluoride and others were unsuccessful for this purpose.

Fluosulfonic acid has been found to be not only one of the few operable fluorinating agents for the preparation of perchloryl fluoride but also the most efficient. In addition, it is one of the most economical forms of fluorinating agent. Thus, the method of this invention, based on the metathesis of a metal oxychloride with an acid fluoride, is more efficient and economical than the previously known methods, giving higher yields of product at lower costs for raw materials and processing. Another advantage of the process is that perchloryl fluoride is formed with a minimum amount of hazardous by-products.

Fluosulfonic acid, in addition to its function as a fluorinating agent in the reaction, also serves as a solvent for the reaction. This desirable effect becomes noticeable as the quantity of fluosulfonic acid in the reaction mass is increased. At higher dilutions of the perchlorate the yields of perchloryl fluoride are significantly better and the quantity of undesirable by-products is correspondingly decreased. The ionization of a dilute solution of a perchlorate in fluosulfonic acid appears to create optimum conditions for the formation of perchloryl fluoride in high yields.

According to my invention perchloryl fluoride is produced by metathesis of a salt of perchloric acid with materials furnishing fluosulfonic acid. The ingredients are mixed in a recator and heated. Perchloryl fluoride is evolved as a gas.

In a preferred embodiment of my invention a salt of perchloric acid is reacted with an excess of fluosulfonic acid with stirring at an elevated temperature. The evolved perchloryl fluoride is scrubbed to remove reactive by-products, e.g., chlorine or chlorine oxides, by passing the gases through a gas-washing solution. The perchloryl fluoride gas may be collected in a gas-holder from which it may be used directly, and from which it may be liquefied by compression or refrigeration, if desired. The used fluosulfonic acid may be reconditioned for use by distillation.

In an advantageous procedure for practising my invention fluosulfonic acid is mixed with potassium perchlorate in the ratio of at least six moles, and preferably about 12 moles, of fluosulfonic acid to one mole of perchlorate. The mixture is placed in an acid-resistant reactor, stirred and heated gradually to a temperature up to the boiling point of the fluosulfonic acid, a temperature from 40 to 90° C. being preferred. As the perchloryl fluoride gas forms, it is passed through a cold-water-cooled reflux condenser to strip out entrained fluosulfonic acid and easily condensible gases. The effluent gases are passed through an aqueous scrubbing solution containing up to 25% caustic soda and up to 25% sodium thiosulfate. The perchloryl fluoride is substantially unaffected by the washing solutions. The gas is liquefied by use of a cold-trap containing liquid oxygen or liquid nitrogen or a mixture of both, or by mechanical compression, the latter being preferred. The crude perchloryl fluoride contains some oxygen. This latter gas is removed by venting it from the liquefied perchloryl fluoride.

In pumping perchloryl fluoride the same precautions must be taken as with liquid oxygen and other strong oxidants to avoid contact of the perchloryl fluoride, under pressure or at moderately elevated temperatures, with easily oxidizable materials.

The perchloryl fluoride is stored in cylinders and may be handled safely by using precautions which apply to similar oxidants in cylinders, e.g., chlorine, fluorine and oxygen.

Perchlorates and fluorsulfonic acid can be reacted in most proportions to form some perchloryl fluoride. However, from the standpoint of optimum safety as well as of optimum yield it is preferred to use sufficient excess fluosulfonic acid to dissolve the perchlorate. For potassium perchlorate this condition exists when the fluosulfonic acid is present in the ratio of about 5 parts by weight of acid to 1 of potassium perchlorate. When more perchlorate is used than can be dissolved in the acid, vigorous stirring is required to avoid dormant masses of solid perchlorate which might react explosively with by-products formed in the primary reaction.

The perchlorate preferably used in the method of this invention is potassium perchlorate. Sodium, ammonium, magnesium and lithium perchlorates have also been used with good results. Other perchlorates also can be used to carry out the invention, including perchloric acid. The term "perchlorate," used in certain of the claims, is intended to include prechloric acid. Relative costs and availabilities favor the use of the potassium and sodium salts. Technical grade perchlorate has been found to work as well as material of higher purity. A low chlorate content is desirable in the perchlorate in order to minimize formation of undesirable by-products during the reaction with the fluorinating agent.

The fluosulfonic acid used in the practice of this invention is commercially available, or may be prepared from materials furnishing fluosulfonic acid in situ, e.g., by reacting calcium fluoride in an excess of sulfuric acid, or by absorbing sulfur trioxide into hydrofluoric acid. The term fluosulfonic acid as used in the claims includes all such sources of fluosulfonic acid. The technical grade of fluosulfonic acid containing about 98% $HFSO_3$ has been found satisfactory for use.

Some perchloryl fluoride is formed at all practical process operating temperatures. The rate of formation is a function of time and temperature. For example, at 15° C. a 5% conversion to perchloryl fluoride, based on perchlorate charged, was obtained over a period of days. In contrast, at 85° C., yields of about 60%–70% of perchloryl fluoride are obtained in about 4 hours.

In carrying out the reaction of this invention the preferred temperature is 40° to 90° C. The temperature may be raised to the boiling point of the fluosulfonic acid, which at atmospheric pressure is about 163° C.; however, for economic operation a lower temperature, around 90° C., is preferred. Addition of heat is required to maintain a high rate of reaction. Temperatures above 40° C. are preferred for this purpose. Below 40° C., the reaction between fluosulfonic acid and the perchlorate proceeds at a comparatively slow rate. Some reaction to form perchloryl fluoride occurs, however, even when the reactants are mixed together at a temperature as low as 0° C. This latter feature permits generation of perchloryl fluoride in readily controllable low volumes at temperatures in the range from about 0° C. to about 40° C. where the perchloryl fluoride is used directly from the generator, for example, as a fumigant or as a reactant in another chemical reaction.

The scrubbing solutions used in the gas scrubbers are needed to remove chlorine and reactive gases other than perchloryl fluoride which may be formed. The solutions may be water or may contain up to 25% of an alkali and up to 25% of a reducing agent, preferably some of each. Although aqueous scrubbing solutions are preferred, dry contacting agents may also be used in removing by-product gases from the perchloryl fluoride gas stream. Sodium hydroxide is preferred as the alkali and sodium thiosulfate as the reducing agent. Other contacting agents may also be used for this purpose.

In mixing the reactants in carrying out the process it is preferred to add the perchlorate to the fluosulfonic acid. The perchlorate is preferably used as a small-sized particle which will readily go into solution in the fluosulfonic acid. Complete solution of the perchlorate is desirable but not necessary. When more than 1 part by weight of potassium perchlorate is used per about 5 parts of fluosulfonic acid, the solubility limit is exceeded and a suspension of perchlorate crystals in the acid results. Agitation is desirable to aid solution and to avoid accumulation of large settled masses of perchlorate in the reactor. Mixing is preferably done at room temperatures to carry out the solution step. Mixing is also necessary while carrying out the reaction if the perchlorate is present in excess of its solubility limit in the fluosulfonic acid.

The invention may be practiced as a batchwise or as a continuous operation. It may be carried out in conventional type vessels, for example, common acid-resistant kettle reactors. The reactor vessel may be used in combination with continuous feeders for the ingredients and with a continuous distillation unit for recovery of the fluosulfonic acid for reuse in the reaction.

The perchloryl fluoride can be stored in a water-sealed gas-holder and used directly from it. The gas can be liquefied by compression into ordinary steel vessels of suitable strength.

The time required to carry out the reaction between the perchlorate and the fluosulfonic acid is dependent on the temperature at which the operation is carried out. In a conventional batch-type reactor the reaction can be completed within reaction periods ranging from about 2 to 24 hours. A period of 4 hours is preferred for a charge of 1 part by weight of perchlorate to about 10 parts of fluosulfonic acid at 85° C.

The invention and its practice are further illustrated by the following examples, in which the parts are by weight.

*Example 1*

100 parts of fluosulfonic acid were placed in a glass reactor. 10 parts of crystalline potassium perchlorate were added gradually to the fluosulfonic acid with moderate agitation. The reactor was equipped with a thermometer well extending into the reaction mixture, a nitrogen purging inlet, a mechanical stirrer, and a water-cooled reflux condenser. A take-off tube was attached to the top of the condenser to lead the effluent gases to a series of four gas-scrubbers each half-filled with an aqueous solution containing about 10% caustic soda and about 5% sodium thiosulfate. The gas inlet to the first scrubber was arranged so that the gases passed over and not into the scrubbing solution in the reactor. The outlet led to the other scrubbers in the series, which were fitted so that the gases passed through the solution in each scrubber. A drying tube containing solid potassium hydroxide led the gases from the last scrubber to a liquid-nitrogen-cooled trap into which the product was condensed. The reactor was heated rapidly at first to 50° C. and then slowly to 90° C. The reaction temperature was held at 90° C. by applying heat. The flow of water through the reflux condenser was held so that the temperature of the effluent water from the condenser was around 25° C. Evolution of perchloryl fluoride began to be noticeable at 50° C. and was vigorous at 90° C. The reaction rate was readily controlled by decreasing or increasing the heat to the reactor. The condenser served to reflux fluosulfonic acid and the sulfur trioxide released back to the reactor. Reaction was complete in about 4 hours. A liquid residue comprised mostly of fluosulfonic acid with some potassium acid salts remained in the reactor. The reactor system was purged with nitrogen gas before dismantling it. 5.4 parts of perchloryl fluoride were recovered in the liquid nitrogen trap. The yield of perchloryl fluoride was 73%, based on the amount of potassium perchlorate charged. The perchloryl fluoride boiled at −47.5° C. Its identity was confirmed by infra-red analysis. Its purity was determined by mass spectrographic analysis to be 98.5%, the difference from 100 in the analysis being due to the presence of air and carbon dioxide.

*Example 2*

3.32 pounds of crystalline potassium perchlorate were dissolved with stirring into 33.2 pounds of fluosulfonic acid by adding the crystals to the acid held in a stainless steel reactor. The reactor was equipped with a propeller-type agitator with a variable-speed drive. It was also equipped with a reflux condenser, nitrogen purging inlet, and gas scrubbing vessels similar to those described in Example 1. The reactor was fitted with a thermometer well into which a thermo-couple was led. Electric strip heaters were used to heat the reactor. The gas outlet from the last scrubbing vessel led to a water-sealed gas-holder in which the perchloryl fluoride was collected. The entire apparatus was placed behind a concrete barricade during operation. The reactor contents were stirred at about 60 r.p.m. while the temperature of the reactor contents was gradually raised to 90° C. and maintained at about 90° C. The temperature was regulated by controlling the electric heaters with a variable resistance type current controller and adjusting the flow of room-temperature water through the reflux condenser. Perchloryl fluoride was evolved smoothly over a period of 4 hours.

1.42 pounds of perchloryl fluoride were recovered, representing a yield of 57.8%, based on potassium perchlorate charged. Identity of the product was confirmed by infra-red analysis. The purity of the perchloryl fluoride was determined to be 98.5% by mass spectrographic analysis. The impurities were identified as air and carbon dioxide.

The perchloryl fluoride from the gas-holder was compressed into a steel cylinder using a three-stage gas compressor sealed with a fluorocarbon oil.

The fluosulfonic acid residue from the reactor was re-purified by distillation for reuse in the reaction. About 90% of the unreacted fluosulfonic acid from the reactor was recovered for reuse by distillation.

*Example 3*

66 parts by weight of technical grade potassium perchlorate were added to 100 parts of technical grade fluosulfonic acid (a ratio of 1 mole of $KClO_4$ to 2.1 moles of fluosulfonic acid) in a glass reactor fitted with a thermometer, stirrer, and reflux condenser. While the mixture was slowly stirred, its temperature was raised from 25 to 146° C. at the rate of approximately 30 degrees per hour. Gas evolution began slowly at 60° C., was vigorous from 90 to 120° C., and ceased at 145° C., when the reaction stopped. Unreacted $KClO_4$ was found in the reactor at the end of the run. The effluent gases from the reactor were led from the reflux condenser over an aqueous solution containing 10% NaOH and 5% $Na_2S_2O_3$, and then bubbled through a similar solution. The washed gases were passed over solid KOH to remove moisture. They were then condensed in a receiver cooled with liquid air. At the end of the reaction, the system was purged with dry nitrogen. The receiver containing the condensed product was warmed to −78° C. to boil off oxygen. The product remaining in the receiver was identified as perchloryl fluoride. 8.23 parts of perchloryl fluoride, representing a 16.7% yield, based on perchlorate charged, were recovered.

*Example 4*

154 parts by weight of potassium perchlorate were added to 100 parts of fluosulfonic acid (a ratio of 1 mole of $KClO_4$ to 0.9 mole of fluosulfonic acid) in the apparatus of Example 3. The mixture was stirred and heated gradually from room temperature to 138° C. Gas was evolved vigorously in the range 80 to 138° C. The recovered perchloryl fluoride amounted to 7.1 parts, or a yield of 6.25% based on $KClO_4$ charged. Some unreacted $KClO_4$ was present in the reactor at the end of the run.

*Example 5*

7.7 parts of lithium perchlorate were added to 100 parts of fluosulfonic acid (a ratio of 1 mole $LiClO_4$ to 13.85 moles of fluosulfonic acid) in the apparatus of Example 3. The mixture was stirred and heated gradually from room temperature to about 152° C. Perchloryl fluoride and other gases were evolved in the range 83–145° C. The recovered perchloryl fluoride amounted to 3.6 parts, a yield of 48.6% based on $LiClO_4$ charged.

*Example 6*

8.9 parts of sodium perchlorate were added to 100 parts of fluosulfonic acid (a ratio of 1 mole $NaClO_4$ to 13.85 moles of fluosulfonic acid) in the apparatus of Example 3. The mixture was stirred and heated gradually from room temperature to about 125° C. Perchloryl fluoride and other gases were evolved in the range 50–125° C. The recovered perchloryl fluoride amounted to 4.06 parts, a yield of 55% based on $NaClO_4$ charged.

*Example 7*

17.7 parts of sodium perchlorate were added to 100 parts of fluosulfonic acid (a ratio of 1 mole of $NaClO_4$ acid to 2.08 moles of fluosulfonic acid) in the apparatus of Example 3. The mixture was stirred and heated gradually from room temperature to about 135° C. Perchloryl fluoride and other gases were evolved in the range 70–135° C. The perchloryl fluoride recovered amounted to 1.65 parts, a yield of 8.97% based on $NaClO_4$ charged.

*Example 8*

8.1 parts of magnesium perchlorate were added to 100 parts of fluosulfonic acid (a ratio of 1 equiv. of $Mg(ClO_4)_2$ to 13.85 equiv. of fluosulfonic acid) in the apparatus of Example 3. The mixture was stirred and heated gradually from room temperature to about 125° C. The $Mg(ClO_4)_2$ did not dissolve completely. Large amounts of the solid were present throughout the reaction period. Perchloryl fluoride and other gases were evolved in the range 82–125° C.

*Example 9*

10 g. of potassium perchlorate were added to 100 g. of fluosulfonic acid in a stainless steel autoclave equipped with a pressure gauge. The autoclave was immediately placed in a bath and maintained at a constant temperature of 15° C. The pressure in the autoclave was observed over a period of days. During a period of 4 days, the pressure rose steadily. At the end of the run the autoclave was vented and all volatile material recovered. The volatile material was found to be nearly all $ClO_3F$. About 0.4 g. of volatile product was recovered, representing a 5% conversion to $ClO_3F$ based on the weight of potassium perchlorate charged to the autoclave.

Following procedures substantially as described in the above examples, fluosulfonic acid, or materials furnishing fluosulfonic acid, may also be reacted with other perchlorates, e.g. barium, calcium, nitrosyl, silver, hydrogen and so on, to produce perchloryl fluoride.

Many widely different embodiments of this invention may be made and many process variables obvious to those skilled in the art may be introduced without departing from the scope and spirit thereof and it is to be understood that my invention includes all such embodiments and is not to be limited by the above description.

I claim:

1. A process for the preparation of perchloryl fluoride which comprises mixing an inorganic perchlorate with fluosulfonic acid in the ratio of at least six moles of fluosulfonic acid per mole of said perchlorate, agitating and heating the mixture at a temperature of at least 40° C.

2. A process according to claim 1 in which the inorganic perchlorate is sodium perchlorate.

3. A process according to claim 1 in which the inorganic perchlorate is lithium perchlorate.

4. A process according to claim 1 in which the inorganic perchlorate is magnesium perchlorate.

5. A process for the preparation of perchloryl fluoride which comprises reacting an inorganic perchlorate with a stoichiometric excess of fluosulfonic acid at a temperature of at least 40° C.

6. The process of claim 5 in which the perchlorate is selected from the group consisting of perchloric acid and the perchlorates of potassium, sodium, lithium and magnesium.

7. A process according to claim 1 in which the inorganic perchlorate is potassium perchlorate.

8. A process according to claim 1 in which the inorganic perchlorate is perchloric acid.

9. A process for the preparation of perchloryl fluoride which comprises mixing 1 part by weight of potassium perchlorate with about 10 parts by weight of fluosulfonic acid, agitating and heating the mixture at a temperature of at least 40° C. and recovering perchloryl fluoride from the reaction mass.

10. A process for the preparation of perchloryl fluoride which comprises reacting an inorganic perchlorate at a temperature of at least 40° C. with a sufficient amount of fluosulfonic acid to form perchloryl fluoride.

11. A process for the preparation of perchloryl fluoride which comprises reacting an inorganic perchlorate with a sufficient amount of fluosulfonic acid to form perchloryl fluoride.

12. A process for the preparation of perchloryl fluoride which comprises reacting an inorganic perchlorate at a temperature below 40° C. with a sufficient amount of fluosulfonic acid to form perchloryl fluoride.

No references cited.